C. T. STEPHENS.
Meat-Tenderer.

No. 8,233 Reissued May 14, 1878.

Witnesses:
Alex Scott
F. B. Gross

Inventor:
Clements T. Stephens
per J. R. Nottingham
Atty.

N. PETERS, PHOTO-LITHOGRAPHER, WASHINGTON, D. C.

UNITED STATES PATENT OFFICE.

CLEMENTS T. STEPHENS, OF ITHACA, NEW YORK.

IMPROVEMENT IN MEAT-TENDERERS.

Specification forming part of Letters Patent No. 198,755, dated January 1, 1878; Reissue No. 8,233, dated May 14, 1878; application filed February 19, 1878.

*To all whom it may concern:*

Be it known that I, CLEMENTS T. STEPHENS, of Ithaca, Tompkins county, New York, have invented an Improved Device for Mauling, or Making Tender, Meat, of which the following is a specification, reference being had to the accompanying drawings.

My invention relates to certain improvements in that class of meat-tenderers which are composed of a mallet or weighted head, provided with a series of teeth or knives, by means of which the fibers of the meat may be cut or broken at intervals; and it has for its object to so construct and arrange the teeth or knives that they will cut the meat as much as is conveniently possible, and yet leave the meat with no weak places, so as to retain its original shape and appearance, with as little alteration as possible.

To this end my invention consists in constructing the teeth or knives with incisor or chisel-like edges, and in arranging them in parallel rows across the face of the weighted head or mallet, the cutting-edges of the teeth or knives in each row being set at right angles to those of the adjoining rows, whereby a series of cuts in opposite directions will be given to the meat, as more fully hereinafter specified.

Figure 1:
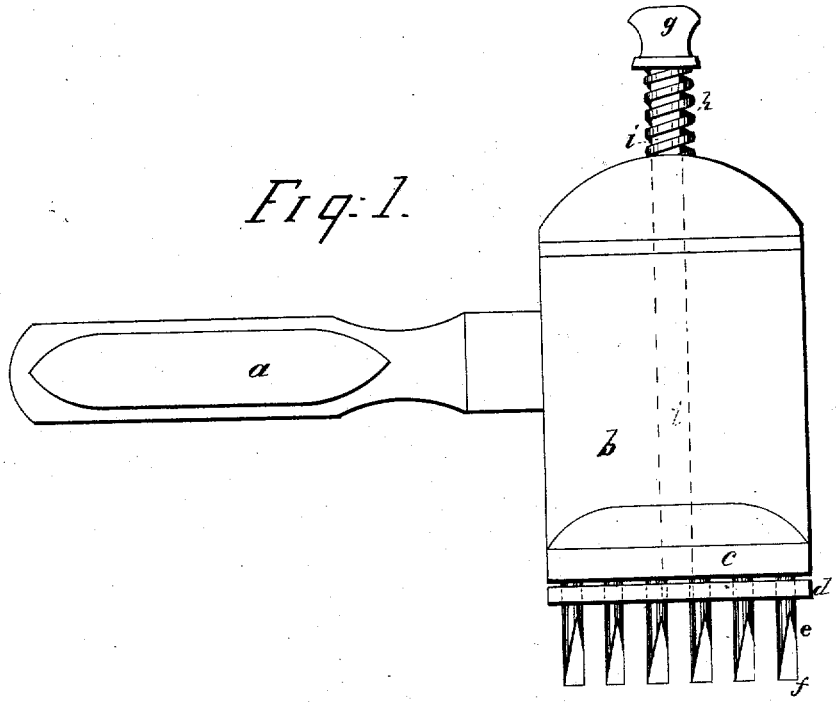
Figure 2:
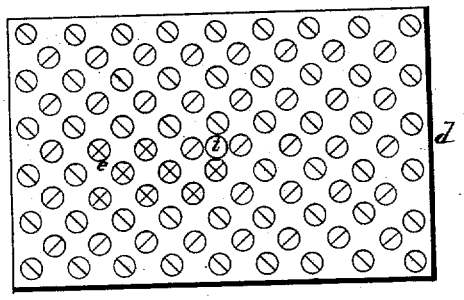

Referring to the drawings, Figure 1 is a side elevation of my meat-mallet, and Fig. 2 is a view of the base of my mallet.

In the figures, *a* is the handle of the mallet, fitting at right angles into the head or weight *b*, which mallet-head is preferably made of wood, and with round, oblong, or rectangular base. To this lower part or base is fitted the tooth-holding plate *c*, which may be either of metal or wood, into which the knives or teeth are secured.

A metal plate has advantages over wood, unless the mallet be of metal, as the teeth or knives, in using, may press sidewise, and also may become clogged with cut pieces of meat, requiring a solid pointed metal instrument to be used for cleaning them, which may be done without injury to the face of the mallet.

Below the plate *c* is a movable cleaning-plate *d*, which fits loosely about the teeth or knives *e*. The teeth or knives are seen projecting below the plates *c* and *d* sufficiently to penetrate to the desired depth. This cleaning-plate *d* is fast to a rod, *i*, which extends from the plate upward through plate *c* and head *b*, lying loosely in an aperture made for it. About it, and just above the mallet-head *b*, is the spring *h*, and above that is the hand-knob *g*.

It will be noticed that by a blow or pat of the hand on the knob the cleaning-plate slides down to the ends of the teeth, and pushes off of the teeth any particles of meat which, by use, accumulate between the teeth, which cleaning rapidly is very useful for my invention.

The teeth *e* are seen to be round, and with chisel-edges *f*, like the incisor-teeth of the human jaw-bone.

It will also be seen that the cutting-edges of the teeth are shown in the row in Fig. 1, as set obliquely to the end of the mallet. Beyond this row are other rows, but they are not even indicated in Fig. 1, lest the attempt to show them should confuse the drawing; but in Fig. 2, which is a view looking down into them in the base of the mallet, the rows are seen and their arrangement. The lines run parallel to the sides of the base of the mallet.

The teeth I have said are preferably made of steel, and round at their base, with incisor or chisel-like edges at their lower ends, as shown in Fig. 1; but in Fig. 2 another variety of edges is seen in a few of the teeth, which have cruciform edges.

It will be observed that, as said of Fig. 1, the cutting-edges of the teeth of the rows parallel to the ends of the mallet are set obliquely, and in Fig. 2 this is also seen, and that the next row have their edges set at right angles to the cutting-edges of the outer row, and that the arrangement of the rows in this respect is the same clear across the mallet-base.

I am aware that a meat-tenderer has heretofore been constructed having a series of needles with double points, the said needles in each row being arranged alternately at right angles to each other; but the pointed ends of the needles, as thus constructed, virtually form simply a series of punctures in the meat, and do not operate to cut the meat in opposite directions, like the chisel pointed knives or teeth of the present invention.

I claim—

1. The meat-tendering mallet made by the handle *a*, the head or weight *b*, tooth-holding base *c*, and cleaning-plate *d*, combined and arranged substantially as set forth.

2. The combination of the handle *a*, the head *b*, tooth-holding base *c*, and cleaning-plate *d*, with the rod *i* extending through the head and provided with a knob, *g*, whereby the cleaning-plate may be operated, substantially as specified.

3. In combination with the mallet-head *b*, the teeth or knives *e*, provided with chisel or incisor cutting-edges *f*, arranged in parallel rows across the face of the head *b*, said chisel or incisor edges in each row being set at right angles to those of the adjoining rows, whereby a series of clear cuts will be given to the meat, substantially as and for the purposes specified.

CLEMENTS T. STEPHENS.

Witnesses:
D. BOARDMAN,
W. A. CHURCH.